United States Patent

Adams

[15] 3,700,396
[45] Oct. 24, 1972

[54] ELECTRO-HYDRAULIC FLOW CONTROL CIRCUIT

[72] Inventor: Cecil E. Adams, Columbus, Ohio

[73] Assignee: Abex Corporation, New York, N.Y.

[22] Filed: June 16, 1971

[21] Appl. No.: 153,891

Related U.S. Application Data

[62] Division of Ser. No. 16,363, March 4, 1970, Pat. No. 3,636,977.

[52] U.S. Cl. ........................91/449, 91/459, 91/461
[51] Int. Cl. ......................F15b 13/02, F15b 13/044
[58] Field of Search...............91/444, 449, 459, 461

[56] References Cited

UNITED STATES PATENTS

| | | |
|---|---|---|
| 3,646,851 | 3/1972 | Mohri..........................91/461 |
| 3,433,131 | 3/1969 | Soyland et al. ..............91/461 |
| 3,129,645 | 4/1964 | Olmsted ......................91/461 |

*Primary Examiner*—Edgar W. Geoghegan
*Assistant Examiner*—A. M. Zupcic
*Attorney*—Wood, Herron & Evans

[57] ABSTRACT

An electronically programmable pressure and flow control hydraulic circuit. The circuit comprises a pair of electronically programmable pressure control valves, one of which is cooperable with a pressure reducing valve and one or more orifices to control flow through the circuit and the other of which controls pressure in the circuit. When the circuit is used in combination with a hydraulic ram or motor, it enables both the force and speed of the ram or motor to be electronically controlled and programmed.

23 Claims, 3 Drawing Figures

PATENTED OCT 24 1972

3,700,396

INVENTOR.
Cecil E. Adams
BY
Wood, Herron & Evans
ATTORNEYS

ELECTRO-HYDRAULIC FLOW CONTROL CIRCUIT

This application is a division of Ser. No. 16,363, filed Mar. 4, 1970, now U.S. Pat. No. 3,636,977.

This invention relates to hydraulic control circuits and more particularly, to an electro-hydraulic control circuit.

There are two basically different styles or types of electro-hydraulic valves; those which utilize servo loops or feedback signals to control a hydraulic function and those which do not. This invention is concerned with electro-hydraulic circuits and valves of the type which achieve a particular hydraulic function in response to an electrical command and without the necessity for any electrical, hydraulic or mechanical feedback signal.

Prior to this invention, the only commercially available non-servo type electro-hydraulic control valves, i.e., valves operable to control a hydraulic function in response to an electrical command and without the necessity for a feedback signal, were of the pressure control type. In other words, the only commercially available non-feedback style electro-hydraulic valves functioned to control pressure in a fluid line in response to an electrical command input and specifically in response to an electronic current command signal or input. These commercially available valves though were not operable to control any other hydraulic function, as for example, rate of flow through the valve.

Heretofore there have been proposed electro-hydraulic flow control valves operable to control the rate of fluid flow through the valve as a function of the electrical command current and without the necessity for a feedback or servo signal. Such electro-hydraulic flow control valves though, exist only in the prior art patents and literature. They have never been commercially produced. As a result, commercial off-the-self non-servo electro-hydraulic valves are operable only to control pressure but not flow.

It has been a primary objective of this invention to provide a control circuit operable to control both flow and pressure in a fluid circuit or to a fluid motor or ram in response to an electronic command input or program and without the necessity for any feedback in the control network. Otherwise expressed, it has been a primary objective of this invention to utilize conventional commercially available off-the-self types of hardware to produce an electro-hydraulic control circuit operable to control both pressure and fluid flow in the hydraulic circuit without the necessity for feedback or servo control loops. The applications for such circuits is nearly unlimited. As one example, such a circuit may be used to control both the pressure (force) and the rate of movement of a hydraulic motor or hydraulic ram. In application, the ram might be caused by this type of circuit to move from a first withdrawn position forwardly at a very fast rate of movement until it reaches a predetermined position. At that position, the ram might be caused to decelerate at a rate determined by the decay of an electrical signal. Thereafter, the ram pressure might be gradually increased from a value of 100 psi to 5,000 psi over a 5 minute period of time. One application for this type of ram movement or cycle is in the movement of a press ram where it is desired to move the ram against very little resistance forward at a very fast rate and then to increase the pressure at a predetermined rate after the ram contacts the work. The invention of this application enables these functions to be programmed very simply and a circuit design for the control of these functions to be very easily accomplished by a mechanic who knows absolutely nothing about servo control functions and design.

Another objective of this invention has been to provide an electro-hydraulic flow control circuit operable to control the rate of fluid flow through an orifice or to a hydraulic motor or to a ram as a function of an electrical command signal and to accomplish this function using only commercially available off-the-shelf non-feedback equipment.

One basic aspect of this invention is predicated upon the concept that the rate of fluid flow through a fixed orifice may be varied by varying the pressure differential of the fluid flowing through the orifice. Utilizing this principle, an electro-hydraulic flow control valve may be made by utilizing a pressure reducing valve in combination with an electro-hydraulic pressure control valve. The function of a pressure reducing valve is to maintain the output pressure of the valve at a preset value irrespective of pressure changes at the valve inlet. By utilizing an electronic pressure control valve to vary or control the output pressure of the pressure reducing valve, the pressure of fluid flowing through a fixed orifice on the output side of the pressure reducing valve may be controlled and varied by the electrical signal to the electronic pressure valve. This combination of pressure reducing valve, electro-hydraulic pressure valve and a fixed orifice therefore results in a fluid circuit capable of electronically controlling the flow through the orifice as a function of the electrical command input to the pressure control valve.

By connecting the input line of the pressure reducing valve to the exhaust side of a hydraulic ram or motor, the flow control circuit heretofore described may be utilized to control the rate of movement of the ram. If an electro-hydraulic pressure control valve is then connected to the input side of the same hydraulic motor or ram, both the pressure or output force and the rate of ram movement may be electronically programmed and controlled as a function of the electrical signals to the two electro-hydraulic pressure control valves of the system.

The result of the ram or motor control circuit heretofore described is that it provides a programmable force and speed or rate of movement hydraulic control circuit which may be designed and programmed without the use or application of any servo systems or feedback systems in the circuit and it accomplishes this function by utilization of commercially available off-the-shelf hardware.

Still another objective of this invention has been to provide a control circuit which enables an electronically programmable pressure control valve to control fluid flow through the circuit.

These and other objects and advantages of this invention will be more readily apparent from the following description of the drawings in which.

Figure 1:
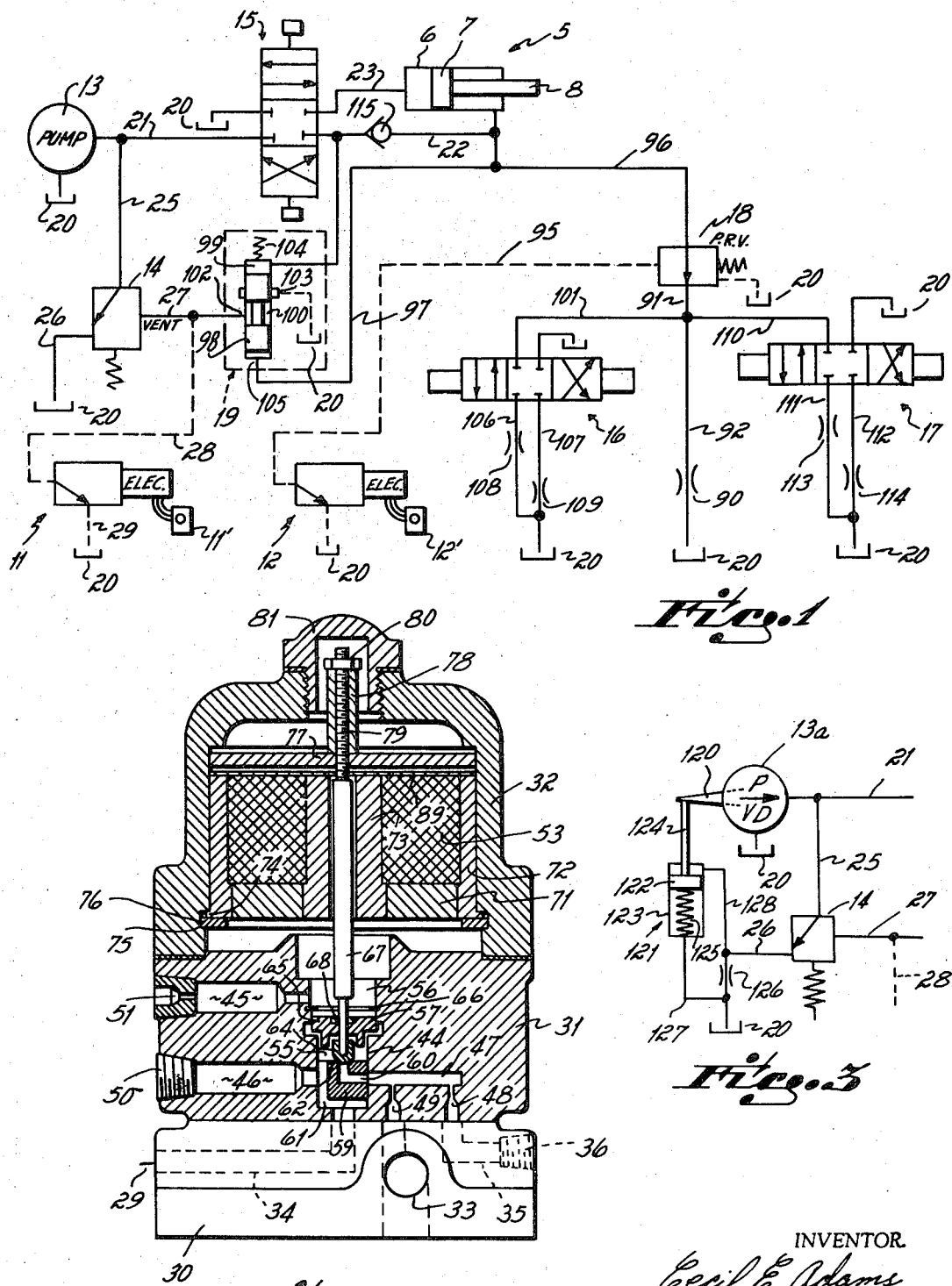
FIG. 1 is a diagrammatic illustration of an electro-hydraulic circuit incorporating the invention of this application.

The electro-hydraulic control circuit of FIG. 1 functions to control both the speed and force of movement of a hydraulic ram or motor 5. This motor comprises a cylinder 6 within which a piston 7 and piston rod 8 are movable. Any machine, as for example, a press die, a machine tool slide, or a brake may be connected to the outer end of the rod 8. So far as the invention of this application is concerned, the machine whose function is controlled by the ram 5 is of no significance.

The circuit of FIG. 1 is electronically programmable through two electro-hydraulic pressure control valves 11 and 12 to control the pressure (force) and flow (speed) of hydraulic fluid to the ram 5. The specific program of these two functions forms no part of the invention of this application. It varies with the application and is as diverse as the number and types of machines which are controlled by hydraulic rams. As an example though, a program for the circuit of FIG. 1 might call for the ram to be initially actuated at a low flow rate (slow speed) as at the beginning of a sequence, then to be automatically controlled to provide a gradually or linearly increasing flow (speed). The sequence might then call for the ram to be thereafter actuatable at a low pressure as at the beginning of a press die closing cycle then to be automatically controlled to provide a gradually increasing pressure until a part in the die is fully formed or compacted. The sequence might then call for the high pressure to be maintained for a predetermined time and then to be relieved at a slowly changing rate. This sequence is a logical one for some press applications, but is one which has heretofore been very difficult to achieve except with complex and expensive hydraulic control circuits which for the most part were prescheduled and could not thereafter be easily varied. The circuit of FIG. 1 though, enables the program to be varied or changed as simply as by changing an electronic program, which might be accomplished by rotation of a dial, programming of an electronic tape or card or by any conventional electronic programming techniques. All that is required in the programmer is that it be capable of changing electric current flow in a coil. Since the programmer for the two electro-hydraulic valves 11 and 12 may take any conventional form, it has been illustrated in the drawings as a box designated by the numerals 11' and 12'. Suitable devices are well known off-the-shelf hardware items which vary from application to application and from one design engineer to another engineer.

In addition to the two pressure control valves 11 and 12, the circuit of FIG. 1 comprises a pressure source or pump 13, a two-stage pressure relief valve 14, three solenoid operated four-way valves 15, 16 and 17, a two-stage pressure reducing valve 18 and a direct operated sequence valve 19. These items are all commercially available off-the-shelf items of hardware available from any one of numerous sources of supply. In its simplest or least complex form, the two solenoid operated four-way valves 16 and 17 may even be removed from the circuit since they function only to enlarge or expand the range of fluid flow (speed) programmable into the circuit.

The pump 13 is a constant volume constant pressure fluid pump operable to supply fluid from a tank 20 to the ram motor 5 via a fluid line 21 and through the solenoid operated directional valve 15. The directional valve 15 is a conventional solenoid operated four-way valve operable to connect either one of two ports of the ram 5 to the pressure line 21 via fluid lines 22 and 23 and the other one of the ports to tank 20.

For simplicity of the drawings, the tank 20 is shown at numerous locations on the drawing but it is to be understood that in practice, there is only one tank or fluid reservoir to and from which fluid is supplied by the valves of the circuit. The tank has been designated in this way in the drawings in order to avoid having numerous extra fluid lines shown which only serve to complicate the circuit diagram and render the drawings more difficult to understand.

The two-stage pressure relief valve 14 is a conventional pressure relief valve. One such valve suitable to this application is illustrated in U.S. Pat. No. 3,373,763. Functionally, this valve operates to spill fluid from line 21 via lines 25 and 26 to tank 20 whenever the pressure in the line 21 exceeds the pressure setting of the pilot or first stage of the valve. The setting at which the pressure relief valve 14 is operable to dump fluid to tank and thereby maintain the pressure in the valve intake line at the preset value is adjustable manually. This is accomplished by adjusting the spring pressure which maintains the poppet or first stage of the valve closed. As shown in FIG. 1, a second fluid path to tank 20 past the poppet or first stage of the valve 14 is provided through a conduit 27. This conduit provides a parallel path bypassing the poppet valve stage or first stage of the pressure relief valve 14 via lines 27 and 28 through the electro-hydraulic valve 11 and line 29 to tank 20. This second or alternate path parallels the poppet or first stage of the valve so that the relief valve 14 may either dump fluid to tank and thereby relieve pressure in the fluid line 21 through the first stage of the valve or via the electro-hydraulic valve 11. To enable the electro-hydraulic valve 11 to be connected in parallel with the first stage of the valve, commercially available valves of the type shown in U.S. Pat. No. 3,373,763 are generally provided with a port which opens into the pressure chamber of the first stage of the valve. In the case of the valve illustrated in FIG. 1 of U.S. Pat. No. 3,373,763 this port is not illustrated because of the location of the cross-section through which the drawing is taken but it opens into the chamber designated by the numeral 72. By connecting the fluid line 27 to the first stage port (not shown) of the valve illustrated in the above identified patent, the electro-hydraulic valve may be used to control the pressure setting of the relief valve so long as the pressure setting of the electro-hydraulic valve is less than the manually adjusted pressure setting of the first stage of the valve. When used in this application, the pressure relief valve of the patent is manually adjusted to a value substantially greater than the maximum value to which the electro-hydraulic valve 11 is adjustable.

For purposes of completing the description of this application, the disclosure of U. S. Pat. No. 3,373,763 issued Mar. 19, 1968, to R. Smilges et al. is hereby incorporated by reference. It should be understood though that any one of numerous types of two-stage pressure relief valves may be substituted in a circuit of the type shown in FIG. 1 for the pressure relief valve of this patent. Alternatively, the electro-hydraulic valve 11 may be substituted for the first stage of the pressure relief valve illustrated in the above identified patent in which case the electro-hydraulic valve functions to control opening of the second or main stage of the valve.

Figure 2:
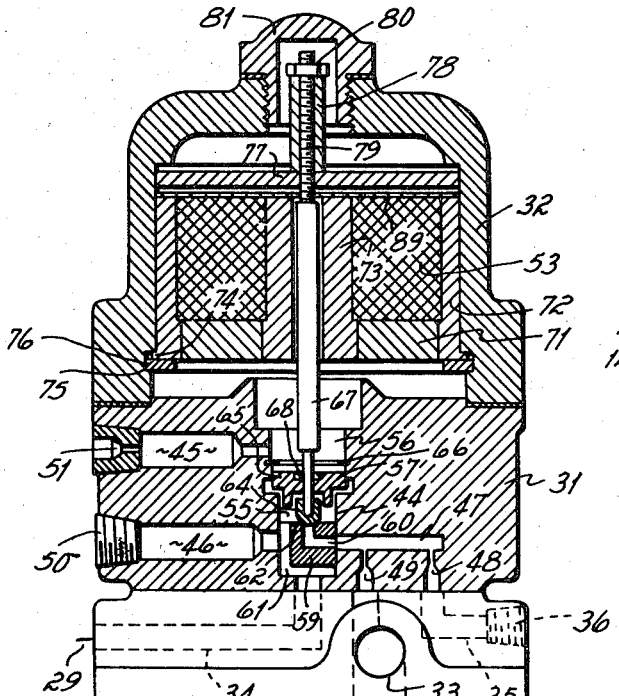
FIG. 2 is a cross-sectional view through an electronically programmable pressure control valve used in the circuit of FIG. 1.

The electro-hydraulic control valve 11 is illustrated in FIG. 2. A complete description of this valve in combination with a pressure relief valve may be found in U. S. Pat. No. 3,250,293, issued May 10, 1966 to C. E. Adams et al. and assigned to the assignee of this application.

Very briefly, this valve 11 comprises a housing assembly of a base 30, a body 31 and a cap 32. These housing components 30, 31 and 32 are held in an assembled relation by screws, none of which are shown in the drawings.

The base plate 30 functions as a port plate into and from which fluid is supplied via the fluid lines 28 and 29. This plate has three conduits extending through it; one an intake conduit 33, the second a drain conduit 34 and the third a plugged conduit 35 blocked by a plug 36. The intake conduit 33 opens into a vertical orifice 49 in the body 31 and the conduit 35 opens to a vertical orifice 48. The drain conduit opens into an axial bore 44 in the body 31.

The body 31 includes a flat generally circular bottom surface adapted to sealingly mate with the top surface of the base plate 30. The axial bore 44 is stepped and is intersected at spaced points by horizontally extending bores 45, 46 and 47. The bore 47 is connected to the intake pressure line 28 through conduit 33 and vertical orifice 49. The bore 46 is closed by a solid plug 50 while the bore 45 is partially closed by a breather or vent plug 51.

The axial bore 44 is divided into two chambers, one a wet chamber 55, and the other a dry chamber 56 by a seal and guide assembly 57. A cylindrical valve seat 59 is placed into that portion of the stepped bore 44 which cooperates in forming the wet chamber 55. This valve seat is provided with a right angled passageway 60 which connects the bore 47 to the center of the upper end or valve seat of the insert 59. The valve seat insert 59 also includes a fluid conducting passageway or groove 61 which extends axially along its side and across its bottom to connect the wet chamber 55 with the bore 46 and with the small diameter opening at the bottom end of the stepped bore 44, which opening is connected to the drain conduit 34. The upper end of the valve seat insert 59 is provided with a circular flat surface 62 which surrounds the exit of the passageway 60. This flat portion 52 forms a valve seat against which the flat bottom surface of a cup shaped poppet 64 is urged.

The seal and guide assembly 57 includes a circular disc 65 having cylindrical outer walls. This disc 65 is inserted into that portion of the bore 44 which cooperates in forming the dry chamber 56 and across a shoulder therein which is adjacent the upper end of the wet chamber 55. An O-ring seal is sandwiched between the bore 44 and the cylindrical outer wall of the disc 65 fixed to form a seal between the two chambers. The disc 65 is retained against axial movement in the bore 44 by a washer 66 and a snap ring, the latter being seated in an annular groove of the bore 44. The disc is also provided with a central axial bore through which an operating rod 67 for the valve formed by the poppet 64 and the seat 62 extends. This central bore is provided with a groove adjacent its top in which there is located an O-ring 68. This O-ring contacts and guides the rod 57.

The cap 32 of the housing is made from a nonmagnetic material such as aluminum. It is bored to receive a core 71 in which a coil 53 is housed. The core 71 is a cup shaped cylinder having side walls 72 which provide magnetic poles and a hollow center post 73 which also provides magnetic poles. The coil 53 is embedded in an insulating plastic material in the core 71. The outside diameter of the core 71 is provided with a peripheral flange 74 which abuts a shoulder 75 on the cap 32. The shoulder is clamped to the cap by a snap ring 76.

The electromagnet, including the core 71 and coil 53, operates an armature which includes the disc 77 which has a hollow hub 78 into which an adjusting screw 79 is threaded. A lock nut 80 is threaded onto the exterior of the hub 78 to lock the screw 79 in an adjusted position within the hub. An externally threaded hollow plug 81 covers the screw 79 and nut 80 and is threaded into a threaded aperture in the top of the cap 32.

A thin spacer washer 89 which is formed of nonmagnetic material is pushed between the armature disc 76 and the magnetic poles formed by the walls 72 and the center posts 73 of the core 71. This spacer washer does not contact the adjusting screw 79 of the armature but its peripheral edge preferably abuts the walls of the bore in the housing cap 32 in order to prevent movement of the spacer washer with respect to the cap 32 and the core 71.

This electronic pressure valve functions as an electrically controlled fluid pressure relief valve adapted to maintain the pressure in conduit 28 at a value determined by the electric current in the coil 53 of the valve.

When fluid pressure in the conduit 28 and thus in the orifice 49 and passages 47 and 60, acting upon the valve element 64, overcomes the magnetic force of the coil 53 acting on armature 76, fluid will begin to flow through the pressure limiting and shut-off valve 62, 64 with the result that there may be a pressure drop in conduit 28. This pressure drop in line 28 results in opening of the first stage of pressure relief valve 14 (FIG. 1) and dumping of fluid from the conduit 25 through line 26 to tank 20 until the pressure in line 25 returns to the pressure setting of the electro-hydraulic valve 11; that is the pressure setting determined by the current in coil 53 acting on armature 76.

The electro-hydraulic pressure control valve 11 heretofore described is very similar to that disclosed in U. S. Pat. No. 3,250,293. A more complete description of such a pressure control valve may be found in that patent, the disclosure of which is hereby incorporated by reference for purposes of a more detailed description of this type of valve. The valve is also available as a commercial item from the Abex Corporation, the assignee of this application.

In addition to the circuit heretofore described for controlling pressure supplied to the ram 5, there is also a circuit for controlling flow from the low pressure side of the ram. This latter flow control circuit is operable independently of the pressure control circuit above described.

Basically, the flow control circuit comprises the two-stage pressure reducing valve 18, the output of which flows through one or more fixed orifices 90 in fluid lines 91–92. As is well known, a pressure reducing valve functions to maintain its output flow at a preset pressure irrespective of what variations may occur in the pressure of its input. This principle is utilized to control flow through the orifice 90 since it is well known that flow through a fixed orifice varies as the square root of the pressure forcing flow through the orifice. If the pressure and the size orifice are known, the flow rate through the orifice may be predetermined for any fluid. This principle is utilized in electronically programming fluid flow through the orifice 90 by controlling the pressure of fluid on the outlet side of the pressure reducing valve 18. This control is accomplished by the electro-hydraulic control valve 12. The valve 12 is identical to the electro-hydraulic valve 11 heretofore described with respect to the description of the pressure control circuit.

The inlet port of the electro-hydraulic valve 12 is connected to the poppet or first stage valve control pressure of a conventional commercially available pressure reducing valve. One such suitable pressure reducing valve is illustrated in U. S. Pat. No. 3,246,669 issued Apr. 19, 1966 to C. E. Adams et al., the disclosure of which is hereby incorporated by reference for purposes of completing the disclosure of this application.

The output pressure of a pressure reducing valve is maintained at whatever pressure the valve is preset irrespective of the fact that pressure changes may occur on the inlet side of the valve. The valve described in the above identified U.S. Pat. No. 3,246,669 is a two-stage pressure reducing valve the outlet of which is determined by the setting of a first stage poppet valve. This poppet valve pressure setting may be either manually set or controlled by a pressure setting device connected in parallel with the poppet valve. Commercial embodiments of the valve illustrated in FIG. 1 of U.S. Pat. No. 3,246,669 incorporate a port (not shown in the above identified patent) which opens into the poppet valve control chamber designated by the numeral 101 (in U.S. Pat. No. 3,246,669). A pressure that tends to exceed the preset value determined by the spring 81 in that chamber 101 causes the poppet or first stage of that valve to partially open thereby bypassing pilot or control fluid and pressure to tank. This action limits the pilot or control pressure acting on the upper surface of valves 47,48 and thereby controls the maximum reduced pressure permitted in the outlet or reduced pressure passage 24. As embodied in this application, the port which opens to the control pressure chamber 101 of the pressure reducing valve is connected by fluid line 95 to the electro-hydraulic valve 12 intake port. Thus the electro-hydraulic pressure valve 12 operates in parallel with the first stage of the valve 18 and so long as it is set at a value less than the manual setting of the first stage of the valve 18, controls the outlet pressure of the valve in line 91. In operation, the setting of the electro-hydraulic pressure valve 12 controls the quantity of flow past the orifice 90 by controlling the pressure at which it flows through the orifice. The pressure reducing valve 18 maintains the pressure in line 91 at the setting of the pressure valve 12, and the quantity of flow through this pressure reducing valve 18 is limited by the quantity at the reduced pressure that can pass through orifice 90. Therefore, the exhaust flow that can escape from the discharge side of the ram 5 that is exposed to lines 22, 96 and 97 is limited by the size of orifice 90 and the reduced pressure setting of valve 18 which is controlled by valve 12. The volumetric capacity of the pump 13 is large enough to potentially move the ram 5 at a rate greater than that permitted by most settings of the pressure reducing valve 18 and the size of the orifice 90. Any tendency of the ram 5 to move forward at a rate greater than that selected by valve 18 and orifice 90 will cause the pressure in lines 22, 96 and 97 to rise sharply to the value needed to cause excess pump volume to be bypassed to tank through relief valve 14.

To limit the pressure setting of relief 14 while the flow control circuit is operable to maintain the exhaust flow and therefore the ram speed at the preset value, the direct operated sequence valve 19 is connected in parallel with the valve 11 so that either valve 11 or 19 can lower the pressure setting of valve 14. Specifically, the sequence valve 19 is connected to the exhaust line 22 via fluid lines 96 and 97. This valve consists of a double ended piston 98 movable within a chamber 99 to control fluid flow through a land 100 located between the opposite ends of the piston. This cylinder has a pair of ports 102–103, the port 103 being normally blocked by one end of the piston 98. A spring 104 normally maintains the piston in the blocking position over the port 103. The fluid line 97 is connected to a port 105 in one end of the cylinder such that pressure in this port 105 acts against the spring 104 to open the port 103 so that there is fluid flow from the port 102 through land 100 to the port 103. The port 102 is connected to the pilot or vent fluid line 27 so that it controls bypassing of fluid through the main or second stage of the relief valve 14 whenever the port 103 is partially open. In operation, the spring 104 is preset at a value in excess of the maximum pressure setting of the electro-hydraulic valve 12. For example, if the valve 12 is adjustable through a pressure range of 100–500 psi, the sequence valve 19 might be preset at 600 psi. In the event then that the pressure in the exhaust line 22 of the ram 5 reached the setting of the sequence valve 19— 600 psi in this example—the sequence valve 19 opens to partially vent the relief valve to tank, thereby decreasing the pressure on the intake or pressure side of the ram to the value required to limit pressure equal to the 600 psi setting of sequence valve 19 at the exhaust side of ram 5. If, for example, the ratio of areas between the two sides of piston 7 were two to one, then only 300 psi would be required at the left side of piston 7 to create 600 psi at the right side of this piston.

Valve 19 is not used to limit the ultimate pressure setting of valve 14 when the ram 5 is exerting its force upon the workpiece, but serves only to limit the pressure while the ram is moving to that which will just cause exhaust volume to equal the volume that can be absorbed by pressure reducing valve 18 and orifice 90. At any time that the forward movement of ram 5 tends to fall below the value that supplies the exact exhaust flow that can be absorbed by pressure reducing valve 18 and orifice 90, the pressure in lines 22, 96 and 97 will sharply drop. This lowering of the exhaust pressure allows the sequence valve 19 to restrict the escape of pilot or vent flow from the control section of relief valve 14 through line 27, ports 102 and 103, and to the tank 20. This effect will automatically increase the pressure in lines 21, 23, and 25, and on the excess pump volume being bypassed to tank through relief valve 14 to the point that will reestablish the forward ram speed needed to just supply the quantity of exhaust flow that just equals the volume that can pass through pressure reducing valve 18 and orifice 90.

From the foregoing, it will be seen that the setting of the pressure reducing valve 18 as determined by valve 12 and the size of the orifice 90 limit the forward speed of the ram 5, and the relief valve 14 under the control of sequence valve 19 bypasses at relatively low pressure the excess pump volume not required to sustain the preselected desired ram speed.

It should be noted that sequence valve 19 in no wise influences the pressure or force exerted by the ram 5 against the workpiece. This pressure or force is under control of or limited by the setting of valve 11 which determines the pressure at which valve 14 bypasses fluid to tank at all times when the sequence valve 19 is not lowering the pressure at which valve 14 bypasses fluid to tank as a means for preventing too much speed. If the ram 5 begins to slow up in its forward speed as a result of encountering resistance of the workpiece to its movement, then sequence valve 19 will begin to close, and the pressure setting of valve 14 will rise to the value determined by valve 11.

Electro-hydraulic pressure control valve 11, therefore limits the force applied to the workpiece by the ram, and electro-hydraulic pressure control valve 12 limits the ram speed, with both functions responding to programmed electrical inputs and both functions operate independently of each other, but simultaneously.

As mentioned hereinabove, the flow through a fixed orifice varies as the square root of the pressure forcing fluid through the orifice. Consequently, a wide range of pressures is required to provide a much smaller range of flow in a flow control circuit of the type heretofore described. If the pressure range of the circuit is 4:1, i.e., 100–400 psi, then the range of flow is only 2:1. For this reason it is preferable to incorporate a plurality of electrically programmable different size orifices in addition to the single orifice 90. To that end, the circuit of FIG. 1 incorporates five orifices. The orifice 90 is always connected and open to the fluid line 91 while the other orifices are selectively connectable through the solenoid operated four-way valves 16 and 17. The solenoid operated valve 16 is connected to the fluid line 91 via a line 101. This line may be alternatively connected through the valve 16 to a pair of fluid lines 106, 107 within both of which there is a fixed orifice 108, 109, respectively. Similarly, a fluid line 110 connects the line 91 to one intake port of the valve 17. The outlet ports of the valve 17 are alternatively connectable to the intake line 110 so as to connect outlet lines 111 and 112 to this line 110. The fluid line 111 contains a restricted orifice 113 and the line 112 contains an orifice 114. The orifices 108, 109, 113 and 114 are so sized that when combined with the orifice 90 they provide a range of slightly overlapping fluid flows. For example, orifice 90 alone might have a range of 0.1 to 0.2 gallons per minute at a pressure range of 100–500 psi. Orifice 108 in combination with orifice 90 could be sized to have a flow rate of from 0.2 to 0.4 gallons per minute at a pressure range of 100–500 psi. Orifice 90 in combination with orifice 113 could be sized to have a flow rate of from 0.4 to 0.8 gallons per minute through a pressure range of from 100–500 psi. Orifice 90 in combination with orifice 109 could be sized to have a flow range of from 0.8 to 1.6 gallons per minute in a pressure range of from 100–500 psi. Orifice 114 in combination with orifice 90 could be sized to give a flow rate of from 1.6 to 3.2 gallons per minute through a pressure range of 100–500 psi. Orifices 90, 114 and 109 in combination could give a flow rate of 3.2 to 4.6 gallons per minute. As should now be apparent, the utilization of five selectable fixed orifices rather than a single orifice expands the flow range of a single orifice circuit by 23 times; i.e., from a 2:1 flow range capacity to a range of 46:1. This range could be still further expanded by the use of an even greater number of orifices since they may easily and inexpensively be added to the circuit. As shown and described though, the flow control circuit heretofore described is capable of infinite adjustment of the rate of flow anywhere between 0.1 gallons per minute to 4.6 gallons per minute by varying the pressure setting of the electro-hydraulic valve 12 between 100 and 500 psi and by connecting the appropriate one or ones of the orifices 90, 108, 109, 113 and 114 to tank.

For purposes of describing a typical cycle of operation let it be assumed that the piston rod 8 of the ram 5 is to be moved forwardly from an initial retracted position a preset distance at a speed which results in 4.6 gallons per minute of fluid being exhausted from the rear side of the piston. After moving that preset distance, let it further be assumed that the rod 8 is to continue moving forwardly at a slower rate of speed which results in 0.1 gallons per minute of fluid being exhausted from the low pressure side of the piston. After moving at that rate for a preset distance, let it then be assumed that the ram is to move forwardly with a pressure which increases at a preset rate, as for example, at an increasing rate of 100 psi every 5 seconds until the pressure builds from 300 psi to 700 psi after 20 seconds. After that period of time, let it then be assumed that the pressure is to be decreased from 700 to 300 psi in 5 seconds and that the piston is then to be retracted.

In order to achieve the initial forward speed of 4.6 gallons per minute, the solenoid valve 15 is actuated so as to effect forward movement of the ram. Simultaneously, the solenoid valves 16 and 17 are actuated so as to connect the lines 101 and 110 to the lines 109 and 112, respectively. Thereby fluid is free to flow from the line 91 simultaneously through all three orifices 109, 90 and 114. The program 12′ of the electro-hydraulic valve 12 is then programmed so as to supply electrical current to the coil 53 of a valve which results in pressure in the line 95 being maintained at 500 psi. This in turn results in the outlet pressure in line 91 of the reducing valve 18 being maintained at 500 psi irrespective of any pressure buildup above that value in the intake line 96 to the pressure reducing valve.

The electrical circuit for controlling energization of the solenoid valves 15, 16 and 17 as well as the circuit for energizing or programming the programmer 12' of the electro-hydraulic valve 12 have not been illustrated or described herein since they form no part of the application of this invention. So far as this invention is concerned, the circuit could be as simple as a plurality of switches for controlling energization of the appropriate solenoids of the valves and potentiometer style of variable voltage input to the coil 53 of the electro-hydraulic valve 12. Alternatively, the electric circuit might involve something more complex and sophisticated, as for example, a pre-programmed input card or tape for achieving the control through an appropriate electrical readout device. This type of programming apparatus is all conventional and well known in the art.

With the solenoids of the valves 15, 16 and 17 preconditioned and the appropriate current being supplied to the valve 12 to achieve the preset 500 psi, the piston rod 8 of the ram 5 is moved forwardly by fluid pressure in line 23. The rate at which the piston moves forwardly is controlled by the rate at which fluid is exhausted from the forward or low pressure exhaust side of the ram. In the event that the pressure on the ram exceeds the 500 psi setting of the electro-hydraulic valve and thereby tries to speed up the ram by forcing more fluid through the orifices 109, 90 and 114, the pressure reducing valve allows the inlet pressure to build while still maintaining the preset 500 psi pressure on its output side. Thereby the piston continues to move forwardly at the preset rate irrespective of what resistance it may encounter to forward movement unless this resistance is great enough to cause valve 11 to bypass fluid. If the pressure exceeds the setting of the direct operated sequence valve 19, as for example 600 psi, on the intake side of the pressure reducing valve in line 96, the valve 19 will open the pressure relief valve 14 in the pressure line 21 thereby reducing the pressure of fluid forcing the piston 7 forwardly.

When it is time to reduce the rate of fluid flow and consequently, the speed of movement of the piston ram, the solenoids of the valves 16 and 17 are de-energized so as to close all but the orifice 90 to the fluid line 91. This might be triggered by a switch located in the path of movement of the piston rod 8. Simultaneously, the programmer 12' of the electro-hydraulic valve is adjusted so as to reduce the current to the coil 53, thereby reducing the pressure on the output side of the pressure reducing valve 18 to 100 psi. At this rate, 0.1 gallons per minute of fluid flow flows through the orifice 90 so that the piston rod of ram 5 moves forward slowly even though the pressure in the line 22 may vary from 100 to 600 psi.

When the ram reaches the position at which the pressure is to slowly build from 300 to 700 psi over a period of twenty seconds, the control in command moves from the electro-hydraulic valve 12 to the electro-hydraulic valve 11, again under the control of the electronic program. The program then causes the electronic control unit 11' of the valve 11 to build up the current to the coil of the valve at a programmed rate by slowly increasing the current flow to the valve over a 20 second time period. This could be accomplished by any conventional cam controlled potentiometer or electronic control circuit. As the current increases, the pressure of the fluid in line 25 increases, thereby increasing the pressure to the rear side of the piston so that it continues to be forced forwardly at the increasing pressure. To decrease the pressure from 700 to 300 psi in a period of 5 seconds, the current is reduced to its starting value over the 5 second time cycle.

To reverse the direction of fluid flow to the ram, the solenoid for valve 15 is energized so that the flow for the pump 20 is directed through a oneway check valve 115 in line 22 to the port on the forward side of the ram. Simultaneously, the rear side of the ram is connected to tank. The pressure in line 21 controlling rearward movement of the piston of the ram is then controlled in line 21 by the pressure relief valve 14 and electro-hydraulic pressure control valve 11.

Rather than utilizing a sequence valve 19 to control the pressure relief valve 14 and thereby bypass excess pump volume from the intake or pressure side of the ram 5 to limit ram speed, the pressure on the exhaust side 22 of the ram could also be utilized to regulate flow from a variable delivery pump 13a. In that way, the quantity of flow from the pump into the circuit would be limited to the quantity needed to sustain the ram speed at its preselected rate. A circuit of this type is illustrated in FIG. 3.

Figure 3:
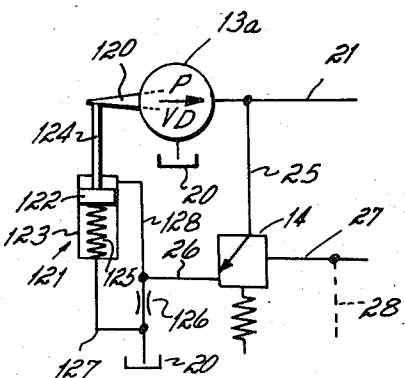
FIG. 3 is a diagrammatic illustration of a second embodiment or modification of the electro-hydraulic circuit of FIG. 1.

Referring now to FIG. 3, there is illustrated a modification of the circuit of FIG. 1. Only a portion of the circuit is illustrated, the remainder of the circuit being identical to that of FIG. 1. Similar numerals have been used in FIG. 3 to designate identical components in the two circuits. Specifically, the circuit of FIG. 3 is identical to the FIG. 1 circuit except that the pump 13a is a variable volume pump rather than a constant volume pump. Its hanger 120 position is controlled by a conventional cylinder control 121. One such suitable cylinder control is available from Dennison Engineering Division of Abex Corporation.

The cylinder control 121 comprises a piston 122 and cylinder 123. The piston rod 124 of the piston is connected to the hanger 120 of the pump 13a and is biased by a spring 125 to a position in which the pump pumps full volume flow into the line 21. The relief valve exhaust line 26 of the two-stage pressure relief valve 14 is connected to one side of piston 122 and to tank 20 through line 128 and a restrictive orifice 126. The other end of cylinder 123 is connected to tank 20 through line 127.

In this embodiment, instead of the exhaust flow of fluid from relief valve 14 bypassing all of the unused volume from a constant volume pump, the exhaust flow from relief valve 14 serves to reduce the displacement of a variable volume pump, so that, the pump 13a delivers into the circuit only the volume required for the preset rate of ram movement. The relief valve exhaust line 26 of the two-stage pressure relief valve 14 is connected to the cylinder so that the back pressure in line 26 causes fluid flow in the line 26 to act against the piston 122 and spring 125 to force the piston 122 downwardly and thereby decrease the volume of flow from the variable volume pump 13a. In operation, whenever the relief valve 14 spills fluid into the line 26, it will cause a reduction in the flow rate from the pump 13a. This reduction continues until the relief valve 14 bypasses only the minimum flow required to sustain enough back pressure against piston 122 to maintain the pump delivery at the desired reduced level. At that point the volume of pump 13a will exactly match the volume of fluid required to be exhausted by the ram 5 to match the setting of the electronic flow control valve 12. In other words, in the modification of FIG. 3, rather than spilling fluid to tank whenever either the pressure and/or the volume of flow from the pump exceeds the pressure setting of the electro-hydraulic valve 11 or the flow setting of the electro-hydraulic valve 12, the circuit is operable to reduce the volume of fluid being supplied to the circuit by the pump 13a. The circuit may thus be said to be a pressure and flow compensated and electronically controlled electro-hydraulic circuit. When the circuit demands more flow from pump 13a, relief valve 14 closes and spring 125 urges piston 122 upwardly to increase pump displacement. Fluid on the top side of piston 122 is displaced to tank 20 through line 128 and orifice 126 as the piston 122 is moved upwardly by spring 125.

The primary advantage of the circuits heretofore described is that they utilize conventional off-the-shelf hardware to achieve electrically programmable pressure and flow control of a hydraulic circuit and without the necessity for any elaborate feedback controls or servo systems. Heretofore while circuits of this type to control only pressure have been available, no circuit has been available to control both pressure and flow simultaneously using commercially available equipment. Consequently, the force with which a ram or motor operated was controllable by an electronic programmable circuit without the use of servo systems, but the speed at which the motor or ram operated was not programmable in that fashion.

Another advantage of this circuit is that it enables a manufacturer to control both pressure and flow to an electronically controlled circuit by means of a single style electro-hydraulic valve. The manufacturer need not produce a special flow control electro-hydraulic valve in order to achieve control of the flow function, but may simply combine a conventional electro-hydraulic pressure control valve with a conventional pressure reducing valve to accomplish the flow control function.

While only two modifications of programmable circuits have been illustrated and described herein, persons skilled in the art to which this invention pertains will appreciate numerous changes and modifications of circuits which may be substituted for the ones heretofore described to achieve the same function while still incorporating the invention of this application. Therefore, I do not intend to be limited except by the scope of the appended claims.

Having described my invention, I claim:

1. In combination, a fluid motor and a variable flow control circuit for electronically programming and controlling the rate of movement of a movable element of the motor, said motor having an inlet port and an exhaust port, said circuit comprising,
a first fluid conduit connected to the exhaust port of the motor,
a pressure reducing valve having an inlet port and an outlet port, said inlet port being connected to said first conduit, presettable means in said valve for establishing a preset control pressure in the fluid passing outwardly through said outlet port,
a fluid conduit having an orifice therein connected to said outlet port of said pressure reducing valve, and
an electronically variable pressure control valve connected to the presettable means of said pressure reducing valve for varying the outlet pressure of said pressure reducing valve so that the rate of flow from said motor exhaust port is determined by the pressure at which fluid passes through said orifice, which orifice pressure is electronically variable by said electronically variable pressure control valve.

2. The combination of claim 1 which further includes multiple different size orifices alternatively connectable to said outlet port of said pressure reducing valve to vary the rate of flow from said motor exhaust port.

3. The combination of claim 2 which further includes solenoid operated valve means for connecting said different orifices to said outlet port of said pressure reducing valve whereby both said orifice pressure and the one or ones of said different orifices connected to said outlet port of said pressure reducing valve may be electrically programmed.

4. The combination of claim 1 which further includes pressure control means operable to relieve pressure at the inlet port of the motor when the pressure of fluid at the exhaust port of the motor exceeds the capacity of the flow control circuit.

5. The combination of claim 4 in which the pressure control means comprises a pressure relief valve connected by a fluid line to the inlet port of the motor, said pressure relief valve being operable to dump fluid to tank from the motor inlet line when the pressure of fluid at the motor exhaust port exceeds a preset value.

6. In combination, a fluid motor and an electronically programmable control circuit for controlling and varying the rate of movement and the force of movement of a movable element of the motor, said motor having an inlet port and an exhaust port, said circuit comprising:
an inlet line connected to a source of fluid pressure and to the inlet port of said motor,
an electronically programmable and controllable pressure relief valve connected to said inlet line,
a first fluid conduit connected to the exhaust port of the motor,
a pressure reducing valve having an inlet port and an outlet port, said inlet port being connected to said first conduit, presettable means in said valve for establishing a preset control pressure in the fluid passing outwardly through said outlet port,
a fluid conduit having an orifice therein connected to said outlet port of said pressure reducing valve, and
an electronically programmable and controllable pressure control valve connected to the presettable means of said pressure reducing valve for varying the outlet pressure of said pressure reducing valve so that the rate of flow from said motor exhaust port is determined by the pressure at which fluid passes through said orifice, which orifice pressure is electronically variable by said electronically variable pressure control valve.

7. The combination of claim 6 which further includes multiple different size orifices alternatively connectable to said outlet port of said pressure reducing valve to vary the rate of flow from said motor exhaust port.

8. The combination of claim 7 which further includes solenoid operated valve means for connecting said different orifices to said outlet port of said pressure reducing valve whereby both said orifice pressure and the one or ones of said different orifices connected to said outlet port of said pressure reducing valve may be electrically programmed.

9. The combination of claim 6 which further includes pressure control means operable to relieve pressure at the inlet port of the motor when the pressure of fluid at the exhaust port of the motor exceeds a preset pressure value.

10. The combination of claim 9 in which said pressure relief valve is operable to dump fluid to tank from the motor inlet line in response to the pressure of fluid at the motor exhaust port exceeding a preset value.

11. The combination of claim 10 which further includes multiple different size orifices alternatively connectable to said outlet port of said pressure reducing valve to vary the rate of flow from said motor exhaust port.

12. The combination of claim 11 which further includes solenoid operated valve means for connecting said different orifices to said outlet port of said pressure reducing valve whereby both said orifice pressure and the one or ones of said different orifices connected to said outlet port of said pressure reducing valve may be electrically programmed.

13. In combination, a fluid motor and a motor control circuit including an electronically programmable circuit for controlling and varying the rate of movement and the force of movement of a movable element of the motor, said motor having an inlet port and an exhaust port, said circuit comprising,
   a source of fluid pressure,
   a direction reversing control valve,
   an inlet line connected to said source of fluid pressure and to the inlet port of said motor through said direction reversing valve,
   a pressure relief valve having a first and a second stage,
   an electronically programmable and controllable pressure relief valve connected to said pressure relief valve so as to control bypassing of fluid by said pressure relief valve,
   a first fluid conduit connected to the exhaust port of the motor,
   a pressure reducing valve having an inlet port and an outlet port, said inlet port being connected to said first conduit, presettable means in said valve for establishing a preset control pressure in the fluid passing outwardly through said outlet port,
   a fluid conduit having an orifice therein connected to said outlet port of said pressure reducing valve, and
   an electronically programmable and controllable pressure control valve connected to the presettable means of said pressure reducing valve for varying the outlet pressure of said pressure reducing valve so that the rate of flow from said motor exhaust port is determined by the pressure at which fluid passes through said orifice, which orifice pressure is electronically variable by said electronically variable pressure control valve.

14. The combination of claim 13 which further includes a direct acting sequence valve and means interconnecting said first fluid conduit to said pressure relief valve through said sequence valve so that a pressure in said first fluid conduit above the setting of said sequence valve is operable to open said relief valve and to dump fluid to tank from the motor inlet line.

15. The combination of claim 14 which further includes multiple different size orifices alternatively connectable to said outlet port of said pressure reducing valve to vary the rate of flow from said motor exhaust port.

16. The combination of claim 15 which further includes solenoid operated valve means for connecting said different orifices to said outlet port of said pressure reducing valve whereby both said orifice pressure and the one or ones of said different orifices connected to said outlet port of said pressure reducing valve may be electrically programmed.

17. In combination, a fluid motor and a motor control circuit including an electronically programmable circuit for controlling and varying the rate of movement and the force of movement of a movable element of the motor, said motor having an inlet port and an exhaust port, said circuit comprising,
   a source of fluid pressure,
   a direction reversing control valve,
   an inlet line connected to said source of fluid pressure and to the inlet port of said motor through said direction reversing valve,
   a first pressure relief valve for limiting the pressure of fluid delivered to said motor inlet port from said source of fluid pressure,
   an electronically programmable and controllable second pressure relief valve connected to said source of fluid pressure to limit the pressure of fluid delivered to said motor inlet port in accordance with the electrical setting of said second pressure relief valve,
   a first fluid conduit connected to the exhaust port of the motor,
   a pressure reducing valve having an inlet port and an outlet port, said pressure reducing valve inlet port being connected to said first conduit, presettable means in said pressure reducing valve for establishing a preset control pressure in the fluid passing outwardly through said pressure reducing valve outlet port,
   a fluid conduit having an orifice therein connected to said outlet port of said pressure reducing valve, and
   an electronically programmable and controllable pressure control valve connected to the presettable means of said pressure reducing valve for varying the outlet pressure of said pressure reducing valve so that the rate of flow from said motor exhaust port is determined by the pressure at which fluid passes through said orifice, which orifice pressure is electronically variable by said electronically variable pressure control valve.

18. The combination of claim 17 in which said source of fluid pressure is a variable volume pump having a movable volume controlling member.

19. The combination of claim 18 which further includes a direct acting sequence valve and means interconnecting said first fluid conduit to said first pressure relief valve through said sequence valve so that a pressure in said first fluid conduit above the setting of said sequence valve is operable to move said volume controlling member and reduce the volume fluid delivered to said motor inlet.

20. The combination of claim 17 in which said source of fluid pressure is a variable volume pump having a movable member to control the volume of flow from said pump, and a hydraulic cylinder control to control the position of said member.

21. The combination of claim 20 which further includes a direct acting sequence valve and means interconnecting said first fluid conduit to said first pressure relief valve through said sequence valve so that a pressure in said first fluid conduit above the setting of said sequence valve is operable to open said first pressure relief valve and actuate said cylinder control to reduce the volume of fluid flow from said pump to said motor inlet line.

22. The combination of claim 21 which further includes multiple different size orifices alternatively connectable to said outlet port of said pressure reducing valve to vary the rate of flow from said motor exhaust port.

23. The combination of claim 22 which further includes solenoid operated valve means for connecting said different orifices to said outlet port of said pressure reducing valve whereby both said orifice pressure and the one or ones of said different orifices connected to said outlet port of said pressure reducing valve may be electrically programmed.

* * * * *